United States Patent [19]
Bolind et al.

[11] Patent Number: 6,138,377
[45] Date of Patent: Oct. 31, 2000

[54] APPARATUS AND PROCESS FOR COOLING AND DE-STEAMING CALCINED STUCCO

[75] Inventors: Michael L. Bolind, Ingleside; Michael J. Porter, Hanover Park, both of Ill.

[73] Assignee: United States Gypsum Company, Chicago, Ill.

[21] Appl. No.: 09/357,731

[22] Filed: Jul. 21, 1999

[51] Int. Cl.[7] .................................................. F26B 7/00
[52] U.S. Cl. ........................ 34/304; 34/374; 34/134; 34/137; 34/141; 34/166; 432/151
[58] Field of Search ........................... 34/304, 372, 374, 34/380, 589, 591, 134, 137, 141, 166; 432/13, 58, 151, 214; 110/343, 344, 347

[56] References Cited

U.S. PATENT DOCUMENTS

| | | |
|---|---|---|
| 3,813,211 | 5/1974 | Gommesen ........................... 34/134 X |
| 4,052,149 | 10/1977 | Stiling ........................................ 432/58 |
| 4,101,264 | 7/1978 | Barr . |
| 4,116,005 | 9/1978 | Willyoung ................................. 60/655 |
| 4,144,654 | 3/1979 | Barr . |
| 4,239,421 | 12/1980 | Krauss . |
| 4,245,399 | 1/1981 | Mueller et al. ........................... 34/166 |
| 4,352,718 | 10/1982 | Grun . |
| 4,411,113 | 10/1983 | Zimmermann . |
| 4,439,933 | 4/1984 | Dietrich et al. ....................... 34/166 X |
| 4,542,991 | 9/1985 | Krauss et al. . |
| 4,671,030 | 6/1987 | Krauss . |
| 5,325,606 | 7/1994 | Liborius ..................................... 34/589 |
| 5,437,850 | 8/1995 | Kroehl et al. . |
| 5,522,158 | 6/1996 | Swanson ............................... 34/141 X |
| 5,664,882 | 9/1997 | Green et al. .......................... 34/137 X |
| 5,743,728 | 4/1998 | Cloud et al. ............................. 432/151 |
| 5,954,497 | 9/1999 | Cloud et al. .............................. 432/13 |

OTHER PUBLICATIONS

The Best Way to Cool Down, C. Freimuth, International Cement Review, pp. 41–45, Nov. 1993.

*Primary Examiner*—Stephen Gravini
*Attorney, Agent, or Firm*—Lee, Mann, Smith, McWilliams, Sweeney & Ohlson; John M. Lorenzen; David F. Janci

[57] ABSTRACT

The present invention is an apparatus and process for cooling and de-steaming hot calcined stucco used in the production of gypsum boards or bagged plaster. The apparatus is a fluid bed stucco cooler and comprises a cooler housing having a plenum with two chambers, a first chamber having a stucco inlet and a second chamber having a stucco outlet. The stucco cooler includes cooling coils that are located within the plenum and a fluidization pad positioned through the fluidization pad help to mix the air and the stucco powder to insure fluidization, prevent channeling, and prevent the stucco powder from building up on the cooling coils. The air also forces steam from the hot calcined stucco out through an air outlet located at the top of the stucco cooler, thereby de-steaming the stucco. The stucco flows through the plenum and passes over the cooling coils, thereby cooling the stucco as it reaches the stucco outlet.

24 Claims, 5 Drawing Sheets

APPARATUS AND PROCESS FOR COOLING AND DE-STEAMING CALCINED STUCCO

BACKGROUND OF THE INVENTION

The present invention relates to an improved apparatus and process for cooling and de-steaming calcined gypsum stucco (calcium sulfate hemihydrate). The cooling of gypsum stucco has been of interest in the gypsum industry for many decades. Stucco is physically and thermodynamically unstable at high temperatures. In order to maintain its quality, the stucco should be quickly aerated and cooled below the temperature of calcination (250° F.). This is especially true when the calcined stucco is to be stored over time.

Hot and steamy calcined stucco stored in containers will age over time. This aging process adversely affects many of the desirable properties of the stucco, including pouring consistency, hydration rate, set time, response to accelerator, and potential for strength development. If a storage silo does not empty its contents on a "first-in-first-out" basis, the quality of the stucco removed from storage can vary drastically. Thus, the cooling and de-steaming of calcined stucco before storage is essential to long-term age stability.

Apart from age stability during storage, a further problem is caused by mechanical energy from tube mill grinding during the processing of the stucco. The mechanical energy adds more heat to the stucco, preventing many plants from being able to meet temperature requirements for bagging the stucco. Thus, immediate cooling and de-steaming of hot calcined stucco allows for stucco to be properly bagged. that is required to cool the stucco. Expensive high volume blower equipment is required for such a system.

It is therefore an object of the present invention to provide an upright, compact apparatus for cooling and de-steaming stucco without the large space and high energy requirements of the prior cooling apparatus.

It is also an object of the present invention to provide an apparatus and process for cooling and de-steaming stucco that exhibits higher heat transfer coefficients than prior art cooling apparatus and processes.

It is a further object of the present invention to provide an apparatus for cooling and de-steaming stucco requiring lower pressure, lower capacity and less expensive blower equipment.

These and other objects will become readily apparent after reading the disclosure of the present invention herein.

SUMMARY OF THE INVENTION

The present invention is an apparatus and process for cooling and de-steaming hot calcined stucco used in the production of gypsum boards or plaster products. The apparatus is a fluid bed stucco cooler. Hot and steamy calcined stucco is transferred directly to the apparatus from a calcination kettle. The apparatus can be implemented in a stucco processing line where the stucco may be stored for a period of time after the cooling process, or it can also be directly implemented into a gypsum board production line for immediate use. Each apparatus unit may stand alone or several may be connected in series or parallel, depending on the processing output and cooling requirements of the system.

The apparatus comprises a cooler housing having a plenum with a stucco inlet and a stucco outlet located near the top of the plenum. The plenum is substantially divided into two chambers by a plenum wall, except for a passageway near the bottom of the plenum. The stucco inlet is in direct fluid communication with one of the plenum chambers and the stucco outlet is in direct fluid communication with the other plenum chamber. Thus, a passageway is formed within the plenum from the stucco inlet down to and through the plenum chamber passageway and upward to the stucco outlet.

Hot and steamy stucco powder enters the plenum from a calcination kettle at a temperature of approximately 300° F. and is fluidized by a fluidization pad positioned at the bottom of the plenum of the cooler housing. The fluidization pad is a generally rectangular chamber having a perforated top surface and a bottom surface with an air inlet. The fluidization pad is of relatively short height as compared to the plenum height and is positioned such that the perforated top surface comprises the bottom surface of the plenum. Air supplied by a blower is diffused through the perforated top surface and introduced into the plenum of the cooler housing. In order to increase the effectiveness of the stucco fluidization, agitator units are used to mix the stucco powder with the air to prevent channeling of the air directly through the powder. The agitator units have agitator propellers mounted on shafts that pass through tubes in the fluidization pad such that the propellers are positioned just above the perforated top surface of the fluidization pad. Each agitator unit also has a bearing unit. The agitator units are driven by a motor at an appropriate RPM to insure adequate fluidization.

A plurality of typical cooling coil units having cooling coils are positioned within both chambers of the plenum, thus creating a cooling bed. Each cooling coil unit has a heat transfer fluid inlet and outlet whereby a heat transfer fluid flows through the cooling coil. These cooling coil units can be connected in series with one heat transfer fluid supply line, or each unit can be individually connected to a manifold that provides several individual lines from a main supply line. Typically, the heat transfer fluid is water that is recycled in a cooling water recirculation system within the production facility. The cooling coils are used to cool the stucco that contacts the coils via the fluid bed generated by the cooling system blower and agitators. The stucco enters the first plenum chamber through the stucco inlet at the top of the chamber and flows downward over the cooling coils located in the first chamber by gravitational forces. As the stucco moves through the plenum, it is fluidized via the air introduced through the fluidization pad by the blower. The fluidization of the stucco promotes the natural flow of the stucco past the coils and increases the effective heat transfer from the stucco powder to the cooling coils. The heat transfer fluid flows through the cooling coil units in a direction opposite to the flow of the stucco. When the stucco reaches the bottom of the plenum, it enters the second chamber of the plenum through the bottom plenum passageway and naturally flows upward over the cooling coils located in the second chamber.

During the cooling process, the steam from the stucco and steam mixture is forced upward and out of the plenum through an air outlet. The air outlet is located at the top of the cooler housing and is in direct fluid communication with both chambers of the plenum, thus allowing the removal of steam from both chambers. A disengagement zone is provided at the top of the plenum of the housing below the air outlet. The disengagement zone is an upwardly extending portion of the plenum that provides additional plenum space to allow the stucco powder particles to fall back from the exiting air, thus preventing entrainment of the particles in the air that exits through the air outlet. The stucco is thereby cooled and de-steamed when it reaches the stucco outlet at the top of the second plenum chamber. The cooled and de-steamed stucco is typically at a temperature between 150° F. and 200° F. when it exits the cooler housing, well below the calcination temperature of 250° F. The cooled and de-steamed stucco may then be stored without the risk of substantial adverse effects due to aging.

DETAILED DESCRIPTION OF THE INVENTION

Figure 1:
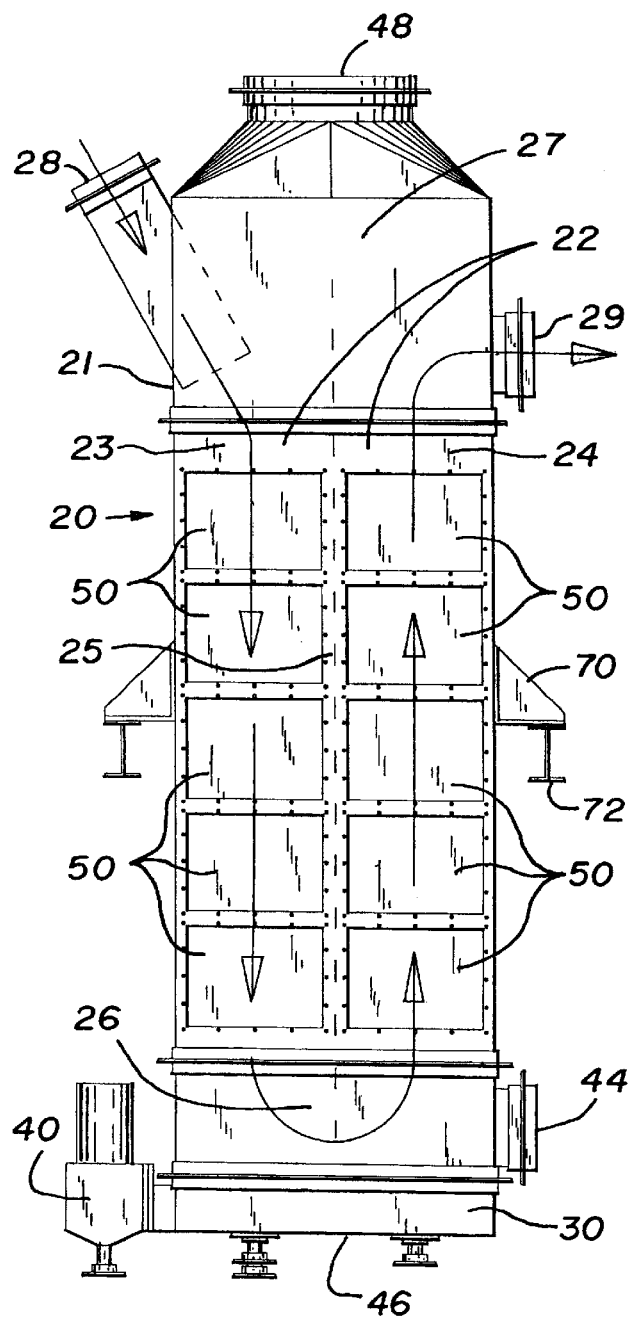
FIG. 1 is a front elevational view of the fluid bed stucco cooling apparatus described herein, indicating with directional arrows the flow path of the stucco powder through the plenum of the cooler housing.
Figure 2:
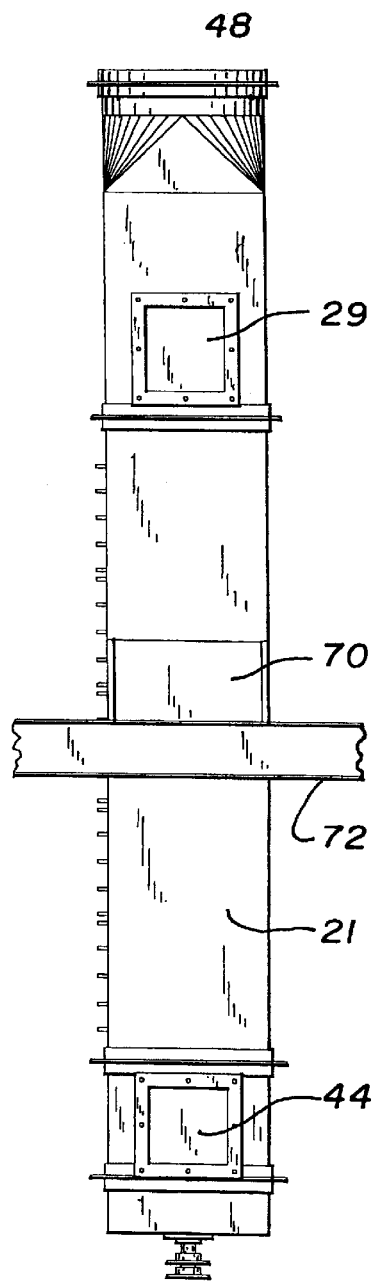
FIG. 2 is a side elevational view of the fluid bed stucco cooling apparatus in FIG. 1.

A fluid bed stucco cooler apparatus 20 for cooling and de-steaming hot calcined stucco is shown in FIGS. 1 and 2. The stucco cooler apparatus 20 essentially comprises a cooler housing 21 having a plenum 22 therein. The plenum 22 is substantially divided into a first chamber 23 and a second chamber 24 by a plenum wall 25, except for a portion of the plenum wall 25 that allows for a passageway 26 near the bottom of the plenum 22. The plenum 22 also has an upwardly extending disengagement zone 27 at the top of the cooler housing 21, above the first chamber 23 and second chamber 24. The cooler housing 21 has a stucco inlet 28 and a stucco outlet 29, both located near the top of the cooler housing 21, below the disengagement zone 27. The stucco inlet 28 is in direct fluid communication with the first chamber 23 of the plenum 22 and the stucco outlet 29 is in direct fluid communication with the second chamber 24 of the plenum 22. Thus, a flow path is formed within the plenum 22 as indicated by the arrows in FIG. 1. Utilizing two plenum chambers effectively increases the length of the flow path within the plenum 22. However, a single chamber plenum can also be used.

Figure 9:
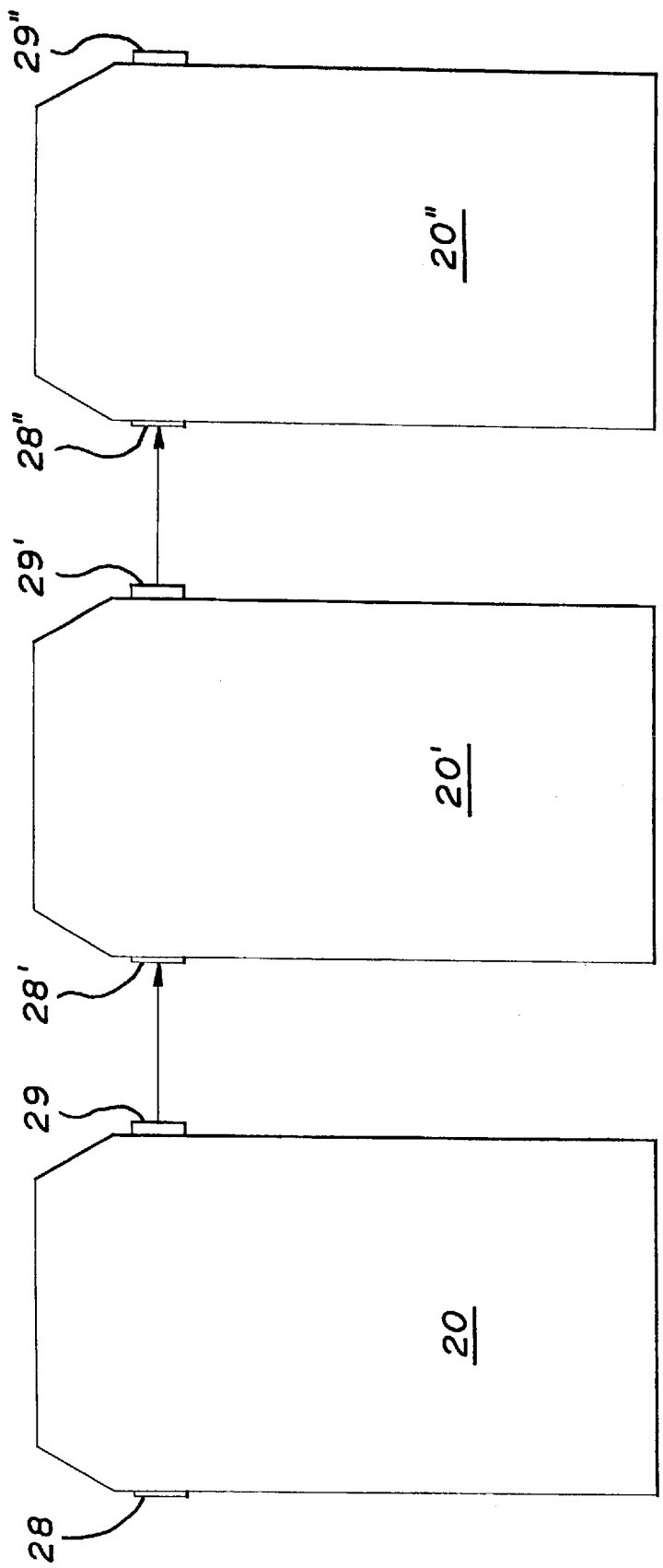
FIG. 9 is a generic diagram showing a stucco cooling system comprising three fluid bed stucco cooling apparatus connected in series.

The stucco cooler apparatus 20 can stand alone or be connected in series with several other coolers as depicted in FIG. 9, depending upon the cooling requirements of the system. In a preferred embodiment, the stucco cooler apparatus 20 is compact and upright, thereby minimizing its overall length. As shown in FIG. 1, a support arm 70 is provided on both sides of the cooler housing 21 in order to support the stucco cooler apparatus in an upright positions. The support arm 70 bears upon a support beam 72.

Figure 4:
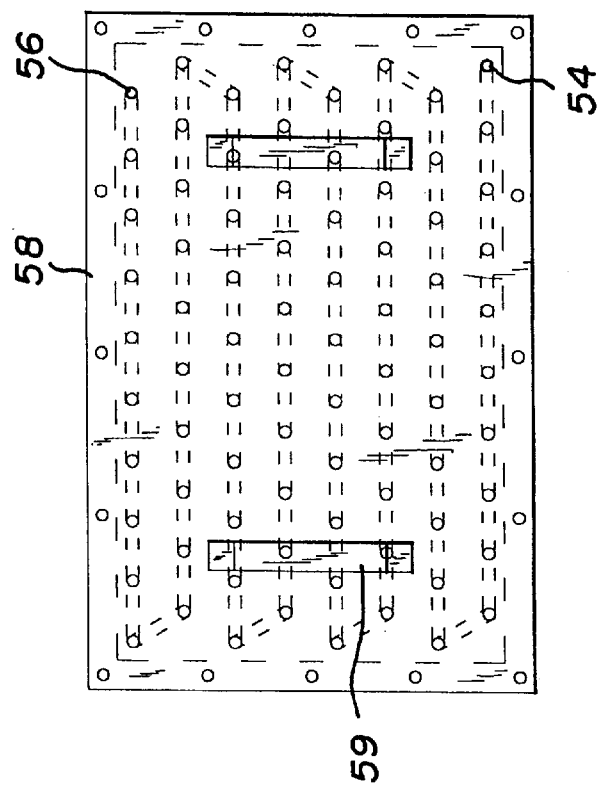
FIG. 4 is a front elevational view of the cooling coil unit.
Figure 3:
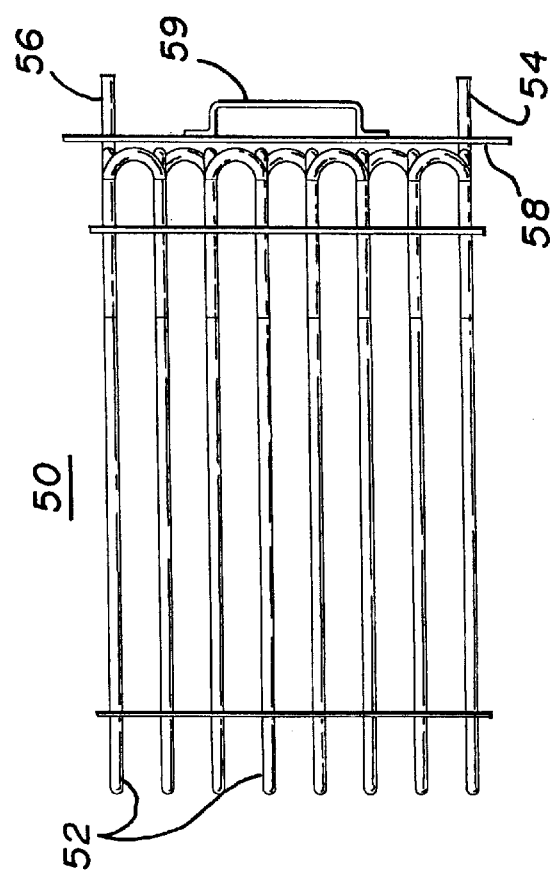
FIG. 3 is a side elevational view of a cooling coil unit showing the cooling coil used to cool the stucco within the plenum of the cooler housing.

A series of cooling coil units 50 are positioned within both chambers 23 and 24 of the plenum 22. The cooling coil units 50 are well known in the heat transfer industry and can be custom designed for a specific application. A typical cooling coil unit is shown in FIGS. 3 and 4. As shown in FIG. 3, each cooling coil unit 50 has a cooling coil 52 that is attached to a front plate 58. In a preferred embodiment, the cooling coil 52 is stainless steel. Stainless steel is used for its strength and reliability. However, copper or other materials conducive to heat conduction are available and can also be used. The cooling coil 52 is spaced apart to allow the stucco powder and air mixture to flow past the cooling coil 52 within the plenum 22 without clogging the flow pat and allowing effective heat transfer from the stucco to the heat transfer fluid within the cooling coil 52. The cooling coil 52 is positioned within the plenum 22 in transverse relation to the flow path of the stucco. In a preferred embodiment, water is used as the heat transfer fluid. Water is typically supplied from a cooling water recirculation system within the processing facility. The temperature of the cooling water is typically in the range of approximately 40° F. to 100° F., depending on the time of year and whether the cooling water has been recycled. Obviously, higher temperature water decreases the heat transfer capacity of the cooling coil 52. The heat transfer fluid enters the cooling coil 52 through a coil inlet 54 and exits through a coil outlet 56. Each cooling coil unit 50 can be connected in series via the coil inlets 54 and the coil outlets 56 with one heat transfer fluid supply line from the cooling water recirculation system, or each cooling coil unit 50 can be individually connected to a manifold (not shown) that provides several individual supply lines that can be directly connected to each coil inlet 54 of each cooling coil unit 50. In this configuration, each coil outlet 56 of each cooling coil unit 50 may also likewise be connected to a manifold (not shown) to allow water to return to a single water return line of the cooling water recirculation system. Heat transfer from the stucco to the water is achieved by fundamental heat transfer principles. The heat transfer fluid flows through the cooling coil units 50 in a direction opposite to the flow of the stucco. If a unit must be replaced or serviced, the cooling coil unit 50 is equipped with handles 59 to allow an operator to remove the unit from the plenum 22 of the cooler housing 21.

Figure 5:
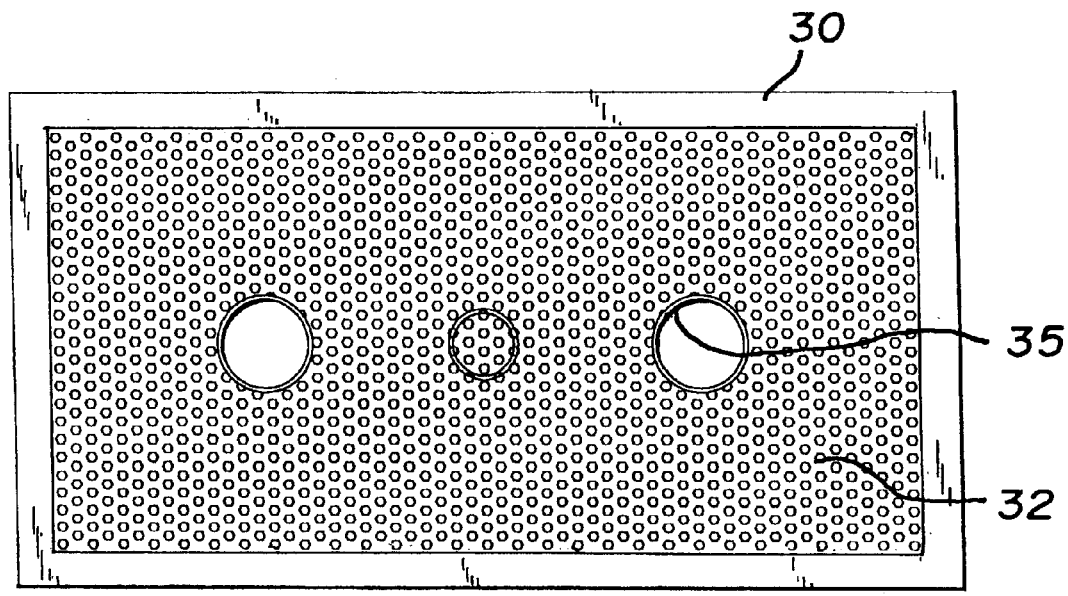
FIG. 5 is a top plan view of the fluidization pad having a top perforated surface.
Figure 6:
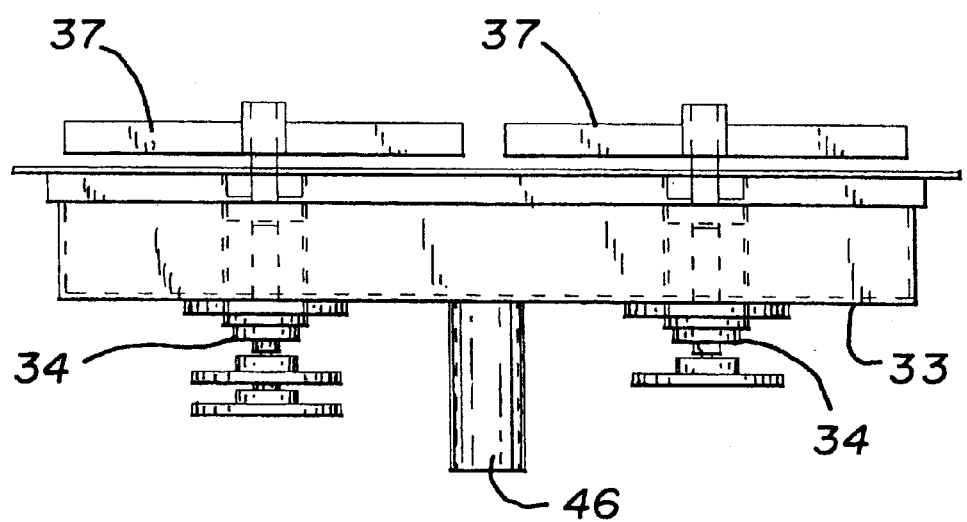
FIG. 6 is a side elevational view of the fluidization pad having agitators mounted thereto.

In order to fluidize the stucco powder, a fluidization pad 30 is provided at the bottom of the cooler housing 21, as shown in FIG. 5. The fluidization pad 30 is a generally rectangular chamber having a perforated top surface 32 and a bottom surface 33 with an air inlet 46, as shown in FIGS. 5 and 6. The fluidization pad 30 is attached to the bottom of the cooler housing 21. The perforated top surface 32 forms the bottom of the plenum 22. The perforations diffuse the air as it enters the plenum 22. Air provided by a blower (not shown) enters the fluidization pad 30 through the air inlet 46 and is diffused through the perforated top surface 32 and introduced into the plenum 22 of the cooler housing 21. This air helps to fluidize the stucco powder so that it effectively flows through the system. This air is also used to help remove the steam from the stucco powder.

Figure 7:
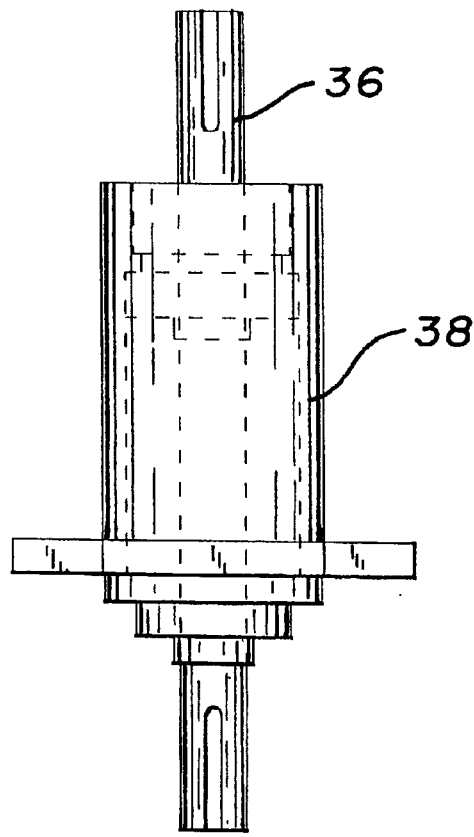
FIG. 7 is a side elevational view of an agitator shaft and bearing unit of the agitators mounted through the fluidization pad in FIG. 6.
Figure 8:
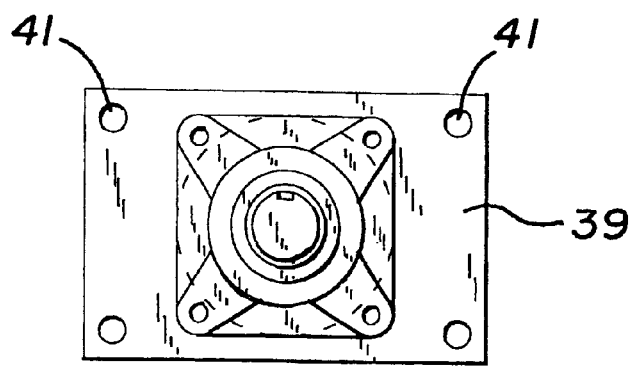
FIG. 8 is a bottom plan view of the agitator shaft and bearing unit in FIG. 7.

In order to prevent the fluidization air from channeling directly through the stucco powder and to avoid stucco powder buildup on the cooling coils 52 and within the plenum 22, agitator units 34 are used to mix the stucco powder with the air. The mixing of the stucco powder by the agitator units 34 also effectively increases the overall heat transfer coefficient of the system. Each agitator unit 34 has an agitator propeller 37 mounted on a shaft 36 that passes through a tube 35 in the fluidization pad 30 such that the propeller 37 is positioned just above the perforated top surface 32 of the fluidization pad 30. The tube 35 is typically a metallic sleeve that is welded to the fluidization pad 30, thereby maintaining the enclosure of the fluidization pad 30. Each agitator unit 34 also has a bearing unit 38, as shown in FIGS. 7 and 8. The bearing unit 38 has a bearing flange 39 having mounting holes 41 therethrough. The bearing unit 38 is inserted through the tube 35 in the fluidization pad 30 and the bearing flange 39 is mounted to the bottom surface 33 of the fluidization pad 30 with bolts or screws. The agitator units 34 are shown mounted to the fluidization pad 30 in FIG. 6. The agitator units 34 are driven by a motor 40, as shown in FIG. 1. In a preferred embodiment, the motor 40 runs at approximately 100 RPM.

The stucco cooler apparatus 20 achieves fluidization by a low pressure blower in connection with the fluidization pad 30 and agitator units 34. Since the stucco cooler 20 merely fluidizes the stucco powder to allow natural flow of the fluidized stucco through the system, a smaller blower may be used to merely fluidize the system. In a preferred embodiment, a blower having a capacity of approximately 10 scfm per square foot of horizontal cross-sectional area of the plenum 22 and providing a pressure head of approximately 7 psi is utilized. This creates the required pressure differential to allow fluidization of the stucco powder in the stucco cooler 20 and the rest of the system. Hot and steamy stucco powder enters the plenum 22 of the stucco cooler 20 from a calcination kettle (not shown) at a temperature typically in the range of 290° F. to 320° F. Referring to FIG. 1, the stucco enters the first plenum chamber 23 through the stucco inlet 28 and flows downward over the cooling coils 52 of the cooling coil units 50 located in the first chamber 23. When the stucco reaches the bottom of the plenum 22, it enters the second chamber 24 of the plenum 22 through the passageway 26 and flows upward over the cooling coils 52 of the cooling coil units 50 located in the second chamber 24 by the natural pressure effects of the incoming stucco powder.

During the cooling and de-steaming process, the fluidized stucco flows through the plenum chambers 23 and 24 and is cooled by the cooling coils 52. The flow of the heat transfer fluid can be varied in order to optimize the overall heat transfer through the cooling coils 52. In a prototype pilot plant system using tap water at an inlet temperature between 60° F. and 93° F., overall heat transfer coefficients of the stucco cooler in the range of 42 BTU/°F. hr ft$^2$ to 54 BTU/°F. hr ft$^2$ were achieved with the system introducing stucco into a fluid bed cooler at a rate in the range of 0.4 tons per hour to 1.2 tons per hour. The stucco cooler 20, as shown in FIG. 1, has a capacity rate of approximately 10 tons per hour. The higher inlet temperature is typical for recycled cooling water at a production plant in the summertime. Obviously, more heat removal can be anticipated by using water or other heat transfer fluid at a lower inlet temperature.

The steam from the stucco mixture is forced upward and out of the plenum 22 through an air outlet 48, as shown in FIG. 1. The air outlet 48 is located at the top of the cooler housing 21 and is in direct fluid communication with both chambers 23 and 24 of the plenum 22, thus allowing the removal of steam from both chambers. The disengagement zone 27 is an upwardly extending portion of the plenum 22 located just above the plenum wall 25 of the plenum 22. As the air is removed from the plenum 22 through the air outlet 48, the disengagement zone 27 provides space to allow the stucco powder particles to drop and fall back before entering the air outlet 48, thereby preventing entrainment of the stucco powder particles in the air that exits through the air outlet 48. The air outlet is typically in fluid communication with a dust collector (not shown), which collects and filters any stucco particle residue within the air. The stucco is thereby cooled and de-steamed when it reaches the stucco outlet 29 at the top of the second plenum chamber 24. The cooled and de-steamed stucco is typically at a temperature between 150° F. and 200° F. when it exits the stucco cooler 20, well below the calcination temperature of 250° F.

Performance requirements of a cooling system can also be met by using more than one cooling apparatus 20. For illustration purposes, FIG. 9 generically depicts a primary cooling apparatus 20, and two secondary apparatus 20' and 20" connected in series. However, it is to be understood that any number of secondary cooling apparatus may be used. The primary apparatus 20 has a stucco inlet 28 and a stucco outlet 29. The secondary apparatus 20' and 20" have a stucco inlet 28' and 28" and a stucco outlet 29' and 29", respectively. The stucco outlet 29 of the primary cooling apparatus 20 is connected to the stucco inlet 28' of the secondary apparatus 20'. In similar fashion, the stucco outlet 29' of the secondary apparatus 20' is connected to the stucco inlet 28" of the secondary apparatus 20". Thus, a system having a series of cooling apparatus is provided.

While specific embodiments of the present invention have been shown here for the purposes of explaining preferred and alternate embodiments of the invention, it is to be understood that the appended claims have a wide range of equivalents and a broader scope than the embodiments disclosed.

What is claimed is:

1. An apparatus for cooling and de-steaming calcined stucco comprising:

a cooler housing having a top portion, a bottom portion and a plenum, the plenum having a stucco inlet, a stucco outlet, and an air outlet, the stucco inlet and outlet defining a flow path therebetween within the plenum, wherein a calcined stucco and steam mixture is introduced into the plenum through the stucco inlet;

means for fluidizing the calcined stucco within the plenum of the cooler housing by the introduction of air within the plenum; and at least one cooling coil having a fluid inlet and a fluid outlet for the passage of a heat transfer fluid through the cooling coil, the cooling coil connected to the cooler housing and positioned within the plenum of the cooler housing transverse to the flow path, wherein the calcined stucco and steam mixture passes over the cooling coil, the stucco exits the plenum of the cooler housing through the stucco outlet, and the steam and air exit the plenum of the cooler housing through the air outlet.

2. The apparatus for cooling and de-steaming calcined stucco of claim 1, wherein the means for fluidizing the calcined stucco comprises:

a fluidization pad having a perforated top portion, a bottom portion, and an air inlet attached to the bottom portion of the fluidization pad, the fluidization pad connected to the bottom portion of the cooler housing and the perforated top portion positioned in communication with the plenum of the cooler housing.

a blower connected to the air inlet of the fluidization pad, wherein air supplied by the blower passes through the perforated top portion of the fluidization pad, thereby diffusing the air into the plenum of the cooler housing;

at least one agitator having a propeller on a shaft projecting through the fluidization pad, the propeller positioned above the top portion of the fluidization pad within the plenum of the cooler housing; and a motor to rotate the propeller of the agitator, whereby the rotating propeller provides agitation to aid in fluidization of the calcined stucco.

3. The apparatus for cooling and de-steaming calcined stucco of claim 2, wherein the bottom portion of the cooler housing has an opening to allow access to the perforated top portion of the fluidization pad and the propeller.

4. The apparatus for cooling and de-steaming calcined stucco of claim 1, wherein the stucco inlet and the stucco outlet of the plenum are located at the top portion of the cooler housing.

5. The apparatus for cooling and de-steaming calcined stucco of claim 1, wherein the plenum of the cooler housing is divided into two chambers by a plenum wall further defining the flow path within the plenum, the two chambers being in communication with each other at the bottom portion of the cooler housing, the stucco inlet being in communication with one of the two chambers of the plenum and the stucco outlet being in communication with the other of the two chambers of the plenum, and the air outlet being in communication with both chambers of the plenum at the top portion of the cooler housing.

6. The apparatus for cooling and de-steaming calcined stucco of claim 1, further comprising a disengagement zone within the plenum of the cooler housing and positioned adjacent the air outlet, the disengagement zone allowing the stucco to drop away from the air outlet and preventing entrainment of the stucco in the air exiting through the air outlet.

7. The apparatus for cooling and de-steaming calcined stucco of claim 1, wherein the cooling coil is attached to a cooling coil unit that is removably attached to the cooler housing.

8. The apparatus for cooling and de-steaming calcined stucco of claim 7, wherein the apparatus has a series of cooling coil units.

9. The apparatus for cooling and de-steaming calcined stucco of claim 8, wherein the passage of the heat transfer fluid through the cooling coil units progresses in a direction opposite to the flow path.

10. The apparatus for cooling and de-steaming calcined stucco of claim 1, wherein the cooling coil is copper.

11. The apparatus for cooling and de-steaming calcined stucco of claim 1, wherein the cooling coil is stainless steel.

12. An apparatus for cooling and de-steaming calcined stucco comprising:
  a cooler housing having a top portion, a bottom portion and a plenum, the plenum having a stucco inlet, a stucco outlet, an air outlet, a first plenum chamber, a second plenum chamber, and a bottom surface, the first plenum chamber and the second plenum chamber defining a flow path within the plenum, wherein a calcined stucco and steam mixture is introduced into the first plenum chamber through the stucco inlet;
  a fluidization pad having a perforated top portion, a bottom portion, and an air inlet connected to the bottom portion of the fluidization pad, the fluidization pad connected to the bottom portion of the cooler housing such that the perforated top portion forming the bottom surface of the plenum of the cooler housing wherein air passes through the perforated top portion of the fluidization pad, thereby diffusing the air into the plenum of the cooler housing;
  a blower connected to the air inlet of the fluidization pad;
  at least one agitator positioned above the top portion of the fluidization pad within the plenum of the cooler housing whereby the agitator provides agitation to aid in fluidization of the calcined stucco; and
  at least one cooling coil having a fluid inlet and a fluid outlet for the passage of a heat transfer fluid through the cooling coil, the cooling coil attached to the cooler housing and positioned within the plenum of the cooler housing, wherein the calcined stucco and steam mixture passes over the cooling coil, the stucco exits the plenum of the cooler housing through the stucco outlet, and the steam exits the plenum of the cooler housing through the air outlet.

13. The apparatus for cooling and de-steaming calcined stucco of claim 12, wherein the blower has a capacity of approximately 10 scfm per square foot of area of the bottom surface of the cooler housing and provides a maximum pressure head of approximately 7 psi.

14. The apparatus for cooling and de-steaming calcined stucco of claim 12, wherein the agitator comprises a propeller on a shaft projecting through the fluidization pad, the propeller positioned above the top portion of the fluidization pad within the plenum of the cooler housing.

15. The apparatus for cooling and de-steaming calcined stucco of claim 14, further comprising a motor to rotate the propeller, whereby the rotating propeller provides agitation to aid in fluidization of the calcined stucco.

16. The apparatus for cooling and de-steaming calcined stucco of claim 12, wherein the cooling coil is attached to a cooling coil unit that is removably attached to the cooler housing.

17. The apparatus for cooling and de-steaming calcined stucco of claim 16, wherein the apparatus has a series of cooling coil units.

18. The apparatus for cooling and de-steaming calcined stucco of claim 17, wherein the passage of the heat transfer fluid through the cooling coil units progresses in a direction opposite to the flow path.

19. A process for cooling and de-steaming calcined stucco powder comprising the steps of:
  (a) introducing a calcined stucco powder and steam mixture into a plenum of a cooler housing, with the mixture entering the plenum near the top thereof;
  (b) fluidizing the calcined stucco powder by introducing air into the bottom of the plenum, diffusing the air and agitating the air and stucco powder;
  (c) flowing a heat transfer fluid through at least one cooling coil positioned within the plenum and allowing the stucco powder and steam mixture to pass over at least one cooling coil positioned within the plenum, thereby transferring heat from the stucco powder to the heat transfer fluid and cooling the stucco powder;
  (d) de-steaming the stucco powder and steam mixture by forcing the steam out of the plenum through an opening at the top of the plenum with the air introduced at the bottom of the plenum; and
  (e) allowing the cooled stucco powder to exit through an outlet at the top of the plenum of the cooler housing.

20. The process for cooling and de-steaming calcined stucco powder of claim 19, wherein the overall heat transfer coefficient of the process is in the range of 42 BTU/°F. hr ft$^2$ to 54 BTU/°F. hr ft$^2$.

21. The process for cooling and de-steaming calcined stucco powder of claim 19, wherein the calcined stucco and steam mixture entering the plenum is at a temperature in the range of 290° F. to 320° F.

22. The process for cooling and de-steaming calcined stucco powder of claim 19, wherein the calcined stucco powder and steam mixture is introduced at a rate of approximately 10 tons per hour.

23. A system for cooling and de-steaming calcined stucco comprising a primary apparatus and at least one secondary apparatus, the primary and secondary apparatus each comprising:
   (a) a cooler housing having a top portion, a bottom portion and a plenum, the plenum having a stucco inlet, a stucco outlet and an air outlet, wherein a calcined stucco and steam mixture is introduced into the plenum through the stucco inlet;
   (b) means for fluidizing the calcined stucco within the plenum of the cooler housing; and
   (c) at least one cooling coil having a fluid inlet and a fluid outlet for the passage of a heat transfer fluid through the cooling coil, the cooling coil connected to the cooler housing and positioned within the plenum of the cooler housing, wherein the calcined stucco and steam mixture passes over the cooling coil, the stucco exits the plenum of the cooler housing through the stucco outlet, and the steam exits the plenum of the cooler housing through the air outlet; wherein the stucco inlet of each secondary apparatus is connected to the stucco outlet of one of either the primary apparatus or another secondary apparatus.

24. A process for cooling and de-steaming calcined stucco powder in the system of claim 23 comprising the steps of:

(a) introducing a calcined stucco powder and steam mixture into a plenum of a cooler housing, with the mixture entering the plenum near the top thereof;
   (b) fluidizing the calcined stucco powder by introducing air into the bottom of the plenum, diffusing the air and agitating the air and stucco powder;
   (c) flowing a heat transfer fluid through at least one cooling coil positioned within the plenum and allowing the stucco powder and steam mixture to pass over at least one cooling coil positioned within the plenum, thereby transferring heat from the stucco powder to the heat transfer fluid and cooling the stucco powder;
   (d) de-steaming the stucco powder and steam mixture by forcing the steam out of the plenum through an opening at the top of the plenum with the air introduced at the bottom of the plenum; and
   (e) either one of allowing the cooled stucco powder to exit through an outlet at the top of the plenum of the cooler housing or allowing the cooled stucco powder to enter a second apparatus wherein the steps of (a) through (e) are repeated.

* * * * *

UNITED STATES PATENT AND TRADEMARK OFFICE
CERTIFICATE OF CORRECTION

PATENT NO. : 6,138,377
DATED : October 31, 2000
INVENTOR(S) : Michael L. Bolind and Michael J. Porter It is certified that error appears in the above-identified patent and that said Letters Patent are hereby corrected as shown below:

In the Abstract
Line 8, after the last word "positioned", please insert the following --at the base of the plenum that introduces air into the cooler. Agitators positioned-- .

Signed and Sealed this

Eighth Day of May, 2001

*Attest:*

NICHOLAS P. GODICI

*Attesting Officer*    Acting Director of the United States Patent and Trademark Office